(12) United States Patent
Morrison (10) Patent No.: US 8,965,390 B2
(45) Date of Patent: Feb. 24, 2015

(54) SIMULTANEOUS COMMUNICATIONS OVER LICENSED AND UNLICENSED SPECTRUM (71) Applicant: T-Mobile USA, Inc., Bellevue, WA (US)

(72) Inventor: Andrew R. Morrison, Bellevue, WA (US)

(73) Assignee: T-Mobile USA, Inc., Belevue, WA (US)

( * ) Notice: Subject to any disclaimer, the term of this patent is extended or adjusted under 35 U.S.C. 154(b) by 0 days.

(21) Appl. No.: 13/753,357

(22) Filed: Jan. 29, 2013

(65) Prior Publication Data

US 2013/0196653 A1 Aug. 1, 2013

Related U.S. Application Data (60) Provisional application No. 61/592,460, filed on Jan. 30, 2012.

(51) Int. Cl.
H04W 72/00 (2009.01)
H04W 28/08 (2009.01)
H04W 72/04 (2009.01)

(52) U.S. Cl.
CPC .......... *H04W 28/08* (2013.01); *H04W 72/0413* (2013.01); *H04W 72/0453* (2013.01)
USPC ........................................ 455/452.2; 455/453

(58) Field of Classification Search
USPC ........................ 370/328–338; 455/426.1, 436, 455/442–446, 452.1–453
See application file for complete search history.

(56) References Cited

U.S. PATENT DOCUMENTS

| 6,433,512 | B1 * | 8/2002 | Birkler et al. ................. 320/132 |
| 6,950,657 | B1 | 9/2005 | Hiller et al. |
| 7,489,902 | B2 | 2/2009 | Amani et al. |
| 7,904,068 | B2 | 3/2011 | Hicks, III |
| 7,916,693 | B2 | 3/2011 | Linebarger et al. |
| 7,949,060 | B2 | 5/2011 | Ling et al. |
| 8,126,473 | B1 * | 2/2012 | Kim et al. .................. 455/452.1 |
| 8,160,588 | B2 * | 4/2012 | Gallagher et al. ............ 455/436 |
| 8,565,178 | B2 * | 10/2013 | Cheng et al. ................... 370/329 |
| 2007/0223508 | A1 | 9/2007 | Nandagopalan |
| 2010/0029216 | A1 | 2/2010 | Jovicic et al. |
| 2011/0019541 | A1 | 1/2011 | Li et al. |
| 2011/0055070 | A1 | 3/2011 | Stanforth et al. |
| 2011/0064034 | A1 * | 3/2011 | Zhu ............................... 370/329 |
| 2011/0194503 | A1 | 8/2011 | Stanforth |
| 2011/0283001 | A1 * | 11/2011 | Jung et al. ...................... 709/227 |
| 2012/0015607 | A1 | 1/2012 | Koskela et al. |
| 2012/0063373 | A1 * | 3/2012 | Chincholi et al. ............ 370/281 |

OTHER PUBLICATIONS

PCT Search Report and Written Opinion mailed May 30, 2013 for PCT Application No. PCT/US13/23820, 9 pages.

* cited by examiner

*Primary Examiner* — Jinsong Hu
*Assistant Examiner* — Tabla Glomah
(74) *Attorney, Agent, or Firm* — Lee & Hayes, PLLC (57) ABSTRACT Techniques to perform simultaneous communications over licensed and unlicensed spectrum are disclosed. A bandwidth monitor measures the amount of bandwidth available from a first communications connection over licensed spectrum, and the amount of bandwidth available from a second communications connection over unlicensed spectrum. Upon receiving a bandwidth request, an optimizer generates a recommendation on how to allocate bandwidth from the first and second communications connections. A load balancer then executes the allocation over the first and second communications requests based at least on the generated recommendation. Various optimization embodiments are further disclosed. Variations on bandwidth monitoring, including polling and notifications are also disclosed.

19 Claims, 5 Drawing Sheets

SIMULTANEOUS COMMUNICATIONS OVER LICENSED AND UNLICENSED SPECTRUM

RELATED APPLICATIONS

This non-provisional utility patent application claims priority to provisional patent application 61/592,460, filed Jan. 30, 2012, titled "Simultaneous Communications over Licensed and Unlicensed Spectrum" which is incorporated by reference in its entirety herein.

BACKGROUND

Presently, there is a proliferation of mobile devices having one or more communications connections. Some communications connections may be dedicated to a single purpose, such as a Global Positioning Satellite ("GPS") receiver for GPS data, or an Ethernet connection for digital data. Other communications connections may be multipurpose, such as a cellular connection supporting both voice and digital data components.

These mobile devices may include smart-phones, laptop personal computers, wireless enabled tablets, portable audio devices, as well as many others, all with applications requiring data access to local area networks and/or to the Internet. This ecosystem in turn has encourages a proliferation of more and more applications using more and more bandwidth. A user once satisfied with accessing text-only electronic mail, begins to demand fast download bandwidth of still digital images, then digital audio, and then video. As digital capture devices such as still cameras and video cameras are integrated into mobile devices, users begin to demand more and more upload bandwidth.

Since mobile devices by their very nature were meant to operate in different locations and environments, mobile devices are increasing equipped with many different communications connections. A mobile device may have a data connection, perhaps over a 3G cellular communications connection. That same mobile device may have or a data connection using a Wi-Fi communications connection via a local wireless access point. For compatibility and roaming purposes, some mobile devices have both 3G and 4G radios, each with its own communications connection, and may switch between the two, depending on service plan and the base station type of the local cell.

Although a mobile device might be flexible enough to use various communications connections, the mobile device may typically use only one communications connection for a particular application, despite multiple communications connections being available. For example, a user accessing electronic mail via a cellular communications connection might walk into a coffee shop and continue the electronic mail session by switching over to a Wi-Fi communications connection. Thus, the user might use either a cellular or a Wi-Fi communications connection, but not both simultaneously.

Where a mobile device uses multiple communications connections simultaneously, the mobile device does not load balance between those communications connections. For example, a mobile device might use a cellular communications connection to browse the Internet, a Bluetooth connection to receive mouse input, and a Global Positioning Satellite ("GPS") connection to receive geolocation data. But the mobile device does not use GPS bandwidth for mouse input, if a Bluetooth channel is saturated. Similarly, the mobile device does not use the GPS connection or the Bluetooth connection when the cellular data connection is insufficient. This is because the GPS connection and the Bluetooth connection do not have access to the same endpoints and/or the same data as the cellular communications connection. Specifically, neither the GPS nor the Bluetooth connections have access to Internet servers.

However, there is a class of communications connections with access to the same end points, whose respective networks overlap each other. Some of these communications connections are licensed spectrum connections that make use of public spectrum licensed by a government entity such as the Federal Communications Commission ("FCC") in the United States, which may include a 4G network cell or a 3G network cell at a particular location. Others are unlicensed spectrum connections that use private bandwidth such as Wi-Fi via a private local access point. In many locations, a mobile device may have access to licensed and unlicensed communications connections, with the same end points. However, presently, a mobile device does not load balance the licensed spectrum and unlicensed spectrum communications connections.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Overview of Licensed and Unlicensed Spectrum Communications

Electronic devices typically communicate with other electronic devices by modulating signals over electro-magnetic frequencies ("EMF"). Some signals may be over physical wires or cables, such as an Ethernet connection for a local network, or a fiber connection communications trunk. However, for mobile device scenarios, including those utilizing smart-phones, tablets, laptops, and the like, the goal is for the mobile device to be able to effect communications without searching for a physical network tap. In these scenarios, mobile devices typically choose to communicate over EMF frequencies that can be carried over the air. Accordingly, the frequencies comprising over the air spectrum are called wireless spectrum.

Since wireless spectrum is finite, there is the possibility that one mobile device may interfere with the communications of another device. Accordingly, most jurisdictions regulate wireless spectrum. Typically, a government will auction spectrum bands for various locations to a cellular operator, or other entity. Alternatively, the government will grant or otherwise convey a license to use the spectrum. If a cellular operator successfully bids for, or otherwise acquires the licensed spectrum, the cellular operator will then construct and/or operate infrastructure, such as base stations, to utilize the licensed spectrum.

Licensed spectrum covers long distance, high power radiation emitters, which may include cellular base stations on standards such as Code Division Multiple Access 2000 ("CDMA2000"), Wideband Code Division Multiple Access ("W-CDMA"), High Speed Packet Access Plus ("HSPA+"), and Long Term Evolution ("LTE") base stations. For purposes of this patent application, licensed spectrum refers to any EMF that relates to frequencies whose use is amenable to long distance and/or high power radiation emission, as to be regulated by license by a government.

In contrast, relatively short distance/low power radiation emitters, have less risk of interfering with other mobile devices. While still regulated, these EMF frequencies are typically not subject to license. For example, in the United States, the Federal Communications Commission ("FCC") regulates unlicensed spectrum via Title 47 of the Code of Federal Regulations, Part 15 ("47 CFR 15").

Unlicensed emitters, include Wi-Fi, Bluetooth, cordless phones, and frequency modulation ("FM") bands for used for low-distance coverage encompassing a single business locale, a residence, or shorter. Also contemplated are transmitters which may have longer range capability but whose focus limits diffusion and therefore limits the potential to interfere with other communications. An example may include laser based communications where the laser intensity is sufficiently low not to cause health hazards. For purposes of this patent application, unlicensed spectrum refers to any EMF that relates to frequencies whose use is amenable to low-distance and/or low power radiation emission, as not to be regulated by license by a government.

A communications connection is an electronic connection between at least two endpoints, or communicating electronic devices. A communications connection may comprise multiple individual communications serial sub-connections, where data from an originating electronic device is relayed from one sub-connection to a subsequent sub-connection, until the data is ultimately received by the intended receiving electronic device. In wireless communications, typically the only wireless portion of the communications connection is the sub-communications connection from the mobile device to the next sub-communications connection. Subsequent sub-communications connections in the wireless communications connection are typically over wire.

For cellular communications, much of the intervening sub-communications connections are managed by a cellular operator's infrastructure. For data communications, one endpoint may be a destination on the Internet, where communications dispatching and relaying is managed by an Internet Service Provider ("ISP"). Note that a communications connection may be characterized by the direction of the flow of the communications data. For purposes of this patent application, communications data flowing from the mobile device to the other endpoint is an upload. Conversely, communications data flowing to the mobile device from the other endpoint is a download.

Figure 1:
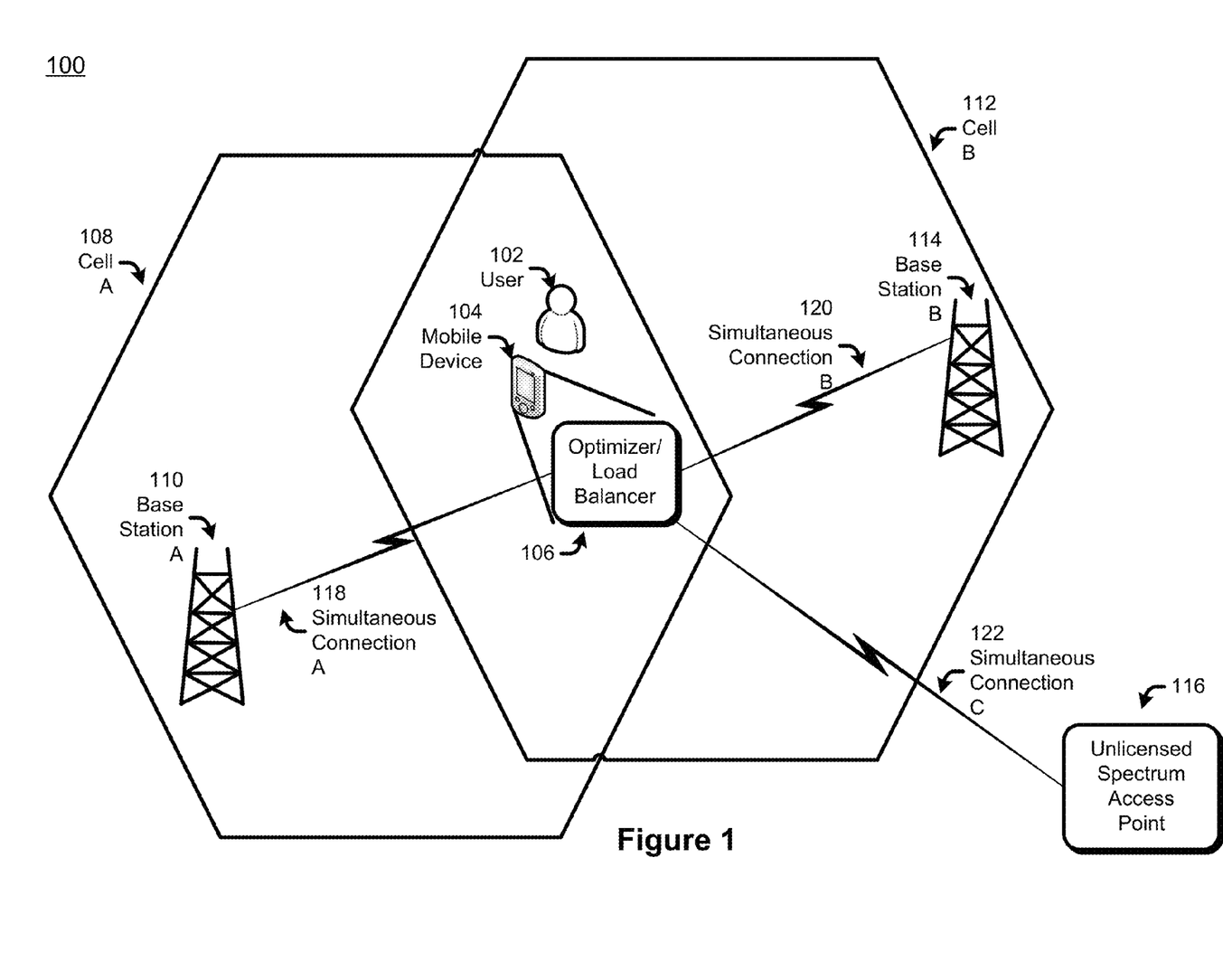
FIG. 1 is an overview diagram illustrating the context of simultaneous communications over licensed spectrum and unlicensed spectrum.

Introduction to Simultaneous Communications Over Licensed and Unlicensed Spectrum FIG. 1 is a top-level diagram 100 illustrating one context of simultaneous communications over licensed and unlicensed spectrum.

A user 102 may wish to engage in wireless communications via mobile device 104. Mobile device 104 may have multiple radios capable of wireless communications, some over licensed spectrum, and others over unlicensed spectrum. Mobile device 104 will have an optimizer/load balancer 106 resident on the mobile device 104. Optimizer/load balancer 106 monitors available bandwidth on the radios on the mobile device 104. In particular, optimizer/load balancer 106 notes which radios on the mobile device 104 are capable of communicating over substantially the same endpoints, as described below. Bandwidth relates to the volume of data for a particular period of time. For example, bandwidth might be measured in bits per second.

If mobile device 104 is located within Cell A 108 as with base station A 110 utilizing licensed spectrum, the optimizer/load balancer 106 may determine whether a communications connection via bases station A 110, could provide access to a particular Internet universal resource locator ("URL") or destination.

At the same time, mobile device 104 may also be located within Cell B 112 with base station B 114 utilizing licensed spectrum. Cell A 108 may be a 3G cellular network and Cell B may be a 4G cellular network. Alternatively, Cell A 108 may be owned by one licensed cellular operator and Cell B 112 may be owned by another licensed cellular operator. Regardless, the optimizer/load balancer 106 determines if the mobile device 104 may engage in a communication connection via both Cell A 108 and Cell B 112, and whether one, both, or neither could provide access to a particular URL or destination.

Similarly, mobile device 104 may also be with range of an unlicensed spectrum access point such as a Wi-Fi access point. Again, the optimizer/load balancer 106 determines if the mobile device 104 may engage in a communication connection with the Wi-Fi access point and whether it could provide access to a particular Internet universal resource locator ("URL") or destination.

Note that if the user 102 desires to access a particular URL or destination, the different potential communications connections to that URL or destination may have different intervening sub-communication connections and therefore may have access to different endpoints. For example, a cellular data link via base station A 110, may be available via user 102's private plan, and may have unlimited access to the Internet. In contrast, access point 116 may be operated by a business that limits certain Internet traffic with a customized firewall. However, optimizer/load balancer 106 may consider both connections to have substantially the same endpoints if the URL's or destinations desired by user 102 may be supported by both communications connections, regardless if exactly the same URLs or destinations are not supported respectively.

Accordingly, optimizer/load balancer 106 may now receive and manage bandwidth requests from applications running on mobile device 104. Applications may include Internet browsers and electronic mail clients. Note that applications running on the mobile device, such as Internet browsers may in turn run client side scripts from applications served from the Internet.

Based on the amount of bandwidth requested by the bandwidth requests, and whether the bandwidth requests are requests to upload data, download data or both, optimizer/load balancer 106 may now cause the bandwidth requests to be satisfied by some combination of a simultaneous connection A 118 via base station A 110, a simultaneous connection B 120 via base station B 114, and a simultaneous connection A 118 via access point 116. Thus optimizer/load balancer 106 can load balance bandwidth requests via simultaneous communications connections over both licensed and unlicensed spectrum.

Figure 2:
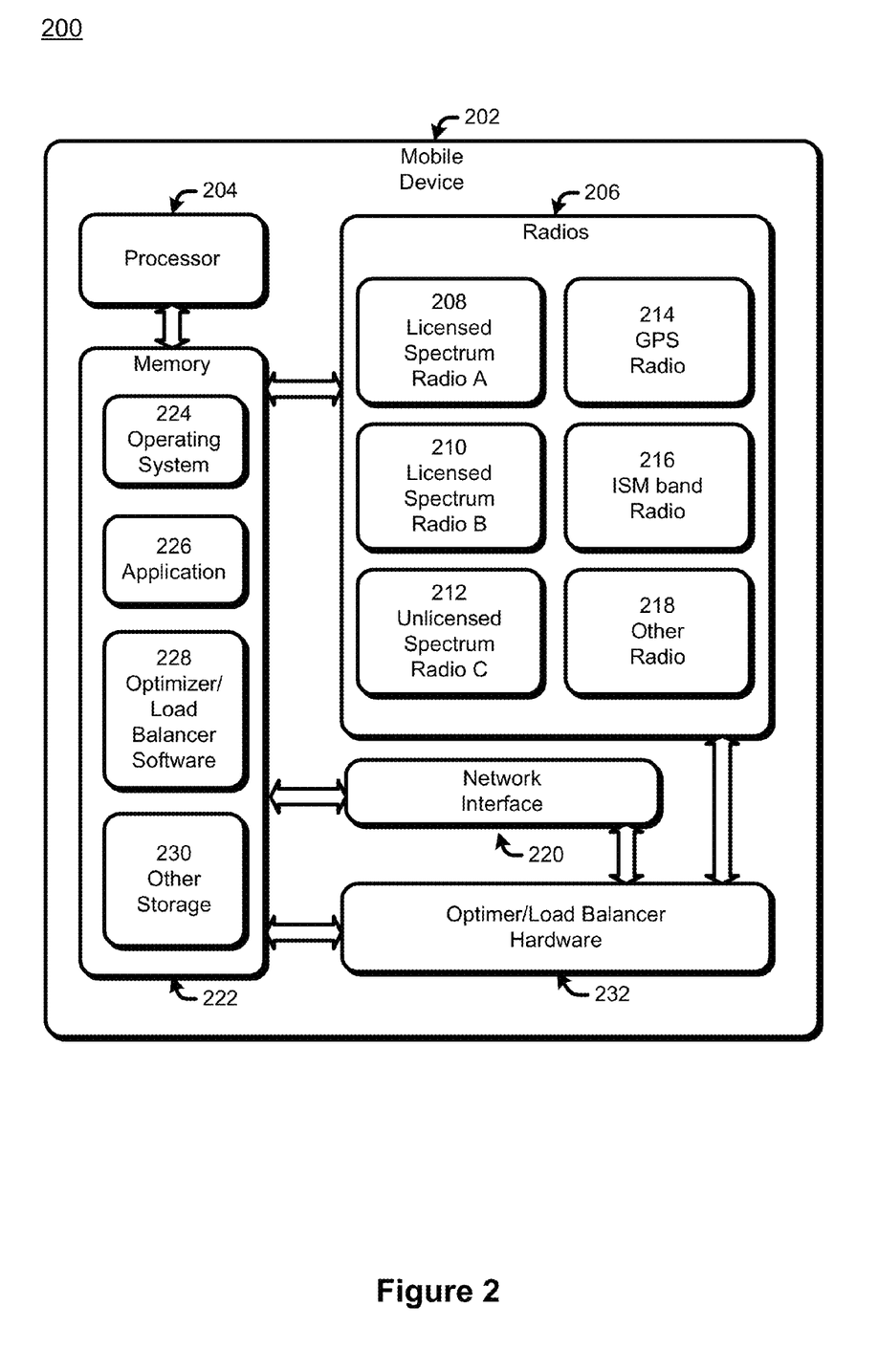
FIG. 2 is a hardware diagram of an exemplary embodiment of simultaneous communications over licensed spectrum and unlicensed spectrum.

Exemplary Hardware Platform for Simultaneous Communications Over Licensed and Unlicensed Spectrum FIG. 2 is a block diagram 200 of an exemplary hardware platform for simultaneous communications over licensed and unlicensed spectrum. Specifically, FIG. 2 illustrates the hardware internals of mobile device 202.

The mobile device 202 may have one or more processors 204 capable of reading and executing computer readable instructions. The mobile device 202 may also support communications over a plurality of radios 206. Some radios such as radio 208 and radio 210 may communicate over licensed spectrum. It is not unusual for mobile devices 202 such as smart-phones to have multiple radios for licensed spectrum. For example, a mobile device 202 may have a radio supporting present cellular standard such as LTE and a second radio supporting a legacy standard such as CDMA. Alternatively, a mobile device 202 may have a radio supporting domestic frequencies and a second radio support foreign frequencies. However, to support simultaneous communications over licensed and unlicensed spectrum, one licensed spectrum radio is sufficient.

The mobile device 202 may support one or more unlicensed spectrum radios such as radio 212, global positioning satellite ("GPS") radio 214, and ISM band (e.q., Bluetooth®) radio 216. A Wi-Fi radio is a common radio that operates over unlicensed spectrum and connects to communications subconnection to the Internet.

The mobile device 202 is not limited to the radios thus far enumerated and may have other radios 218 which may include satellite radios, shortwave, citizens band, and frequency modulation radios.

The mobile device 202 is not limited to wireless communications and may also have a network interface card 220 to participate in wired networks such as a home or corporate local area network ("LAN"). Example network interface cards include Ethernet and token ring cards. There are even other wired communications interface not explicitly illustrated in FIG. 200 which may include modems, a universal serial bus ("USB") and Firewire.

The mobile device 202 has a memory 222 which comprises any computer-readable media with which to read and perform computer readable instructions and to store data. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, Random Access Memory ("RAM"), Read Only Memory ("ROM"), Easily Erasable and Programmable ROM ("EEPROM"), flash memory or other memory technology, Compact Disk ROM ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined in this patent application, computer storage media does not include communication media.

Computer readable instructions in memory 222 may include an operating system 224 such as a general purpose operating system such as Windows™ from Microsoft™, or a mobile device operating system such as Android™ from Google™. Computer readable instructions in memory 222 may include one or more user applications 226 that make bandwidth requests over communications connections, such as Internet browsers and electronic mail clients. One such application includes the software comprising the optimizer/load balancer 106 and related software components. Memory 222 may also have space reserved for other storage 230 long-term and otherwise.

The optimizer/load balancer may be operated fully as software 228 or fully as hardware 232, or as a combination of the two. For the latter two combinations, the mobile client 202 may include optimizer/load balancer specific hardware 232. Example optimizer/load balancer specific hardware 232 may include hardware monitors such as a power monitor to determine power draw against a local battery, or a co-processor to perform load-balancing/optimization specific calculations.

Figure 3:
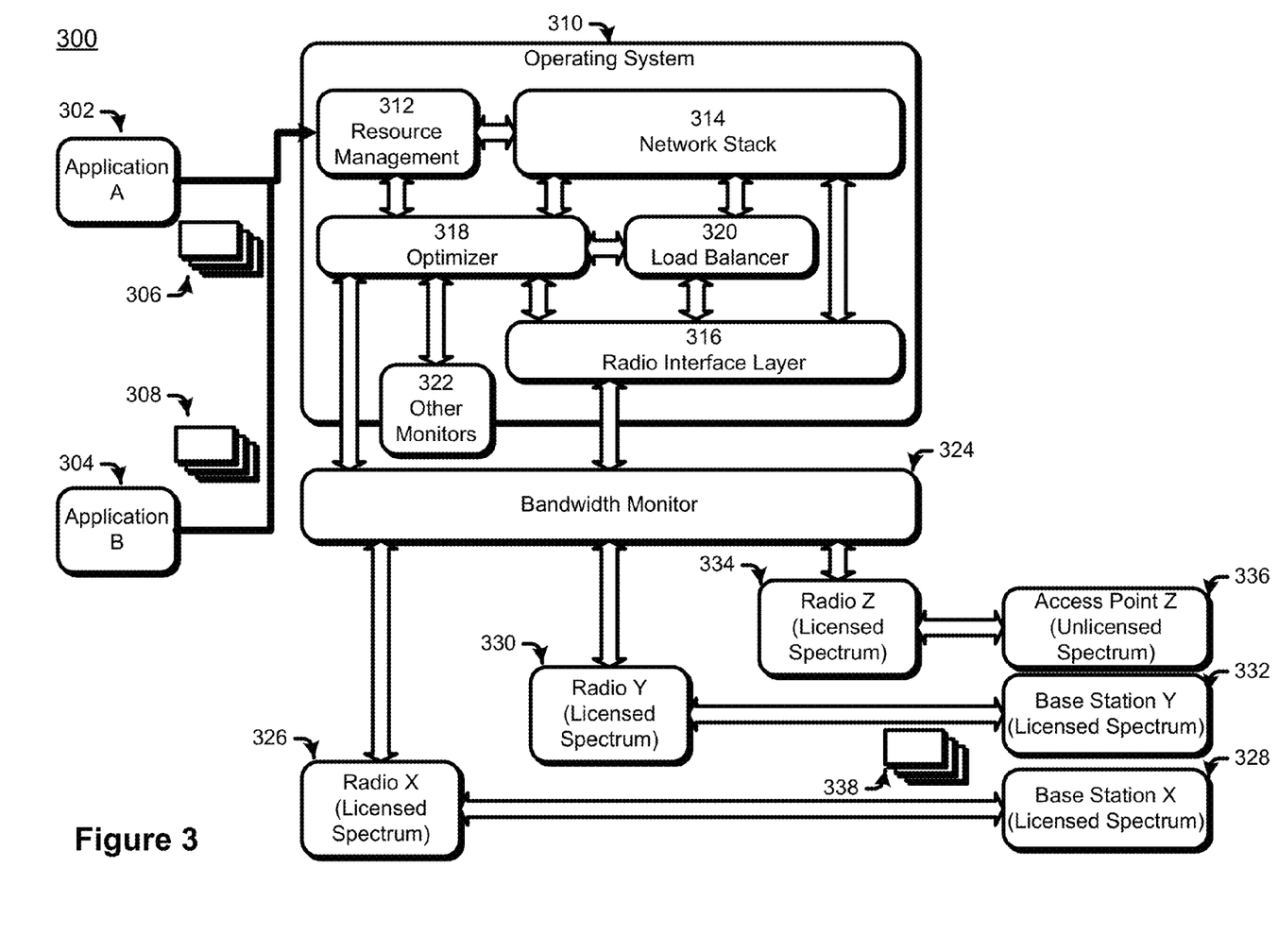
FIG. 3 is an architectural diagram of an exemplary embodiment of simultaneous communications over licensed spectrum and unlicensed spectrum.

Exemplary Architecture for Simultaneous Communications Over Licensed and Unlicensed Spectrum FIG. 3 is an architecture diagram 300 for an exemplary embodiment of simultaneous communications over licensed and unlicensed spectrum.

Operational flow may commence with one or more applications, such as Application A 302 and Application B 304 initiating bandwidth requests 306 and 308 respectively. Bandwidth requests 306 and 308 are programmatic invocations to allocate, deallocate, or reserve bandwidth from one or more communications connections. Bandwidth requests 306 and 308 need not be solely for requesting bandwidth, and may be incorporated in an invocation that includes other purposes. For example, bandwidth requests 306 and/or 308 may be part of a single invocation to create a communications channel, and to obtain bandwidth. Alternatively, bandwidth requests 306 and/or 308 may send a message over the network, in addition to allocating bandwidth.

The programmatic invocations are typically via an application programming interface ("API"), where the API call includes opening a communications port and streaming or receiving data over the port. Since Application A 302 and/or Application B 304 may be programmed to monitor their respective states, they may send state information as to how their respective bandwidth requests 306 and 308 may be satisfied. For example, a bandwidth request 306 and/or 308 may include a priority level, or a reservation of the direction of data flow such as upload, download or both. The bandwidth request 306 and/or 308 may include additional state and information specific to the optimizer/load balancer 320, such as a specific recommendation of a particular type of radio connection to prioritize and/or a profile of how to subdivide the bandwidth request 306 and/or 308 between licensed and unlicensed spectrum. An example recommendation of a bandwidth request 306 and/or 308 might be to reserve downloads via unlicensed spectrum and uploads via licensed. Another example recommendation of a bandwidth request 306 and/or 308 might be to indicate that a large amount of data is to be downloaded and to maximize download over both a licensed and an unlicensed communications connection.

Bandwidth requests 306 and 308 are typically handled by an operating system 310. An operating system 310 may include a resource manager 312. Typical resources managed by a resource manager 312 on an operating system 310 are processes, memory, and input/output ("I/O"). Resources managed by a resource manager 312 may also include a network stack 314. Example network stacks include transport control protocol/internet protocol ("TCP/IP") and internetwork packet exchange/sequenced packet exchange ("IPX/SPX").

The resource manager 312 may forward/execute bandwidth request 306 and/or 308 through the network stack 314 via the radio interface layer 316, a series of drivers and components that expose and manage functionality for radios. However, an optimizer 318 may intercept bandwidth request 306 and/or 308 and develop a recommendation of how to load balance the bandwidth request 306 and/or 308 among the various communications connection available by the various radios. The optimizer 318 then forwards the recommendation to the load balancer 320 to route network stack calls to particular communications channels as exposed by the radio interface layer 316.

The optimizer 318 develops load balancing recommendations based on monitoring the state of mobile device. Some state may come from the applications themselves via application recommendations carried in via the bandwidth requests 306 and/or 308. Other state may come from the network stack 314 and the radio interface layer 316. Yet, other state may cover from other monitors 322, which provide interfaces to optimizer/load balancer hardware 232 (FIG. 2), such as power/battery monitors. Alternatively, other state may come in the form of billing information from the operator or third parties.

A bandwidth monitor 324 may provide state specific to the various communications connections. The bandwidth monitor 324 may be an extension of the radio interface layer 316 or a separate component supplementing the radio interface layer 316. The bandwidth monitor 324 may pass calls to through unchanged to the radio interface layer 316 or may intercept, monitor and potentially modify the calls. In this way, the bandwidth monitor may provide the optimizer 318 with any communications connection state information not readily available via the radio interface layer 316, or to perform preliminary analysis of the communications connections.

Bandwidth monitor 324 may monitor various communications connections which may include radio X 326 communicatively connected to base station X 328, radio Y 330 communicatively connected to base station Y 332, and radio Z 334 communicatively connected to access point Z. Radio X 326 and radio Y 330 may operate over licensed spectrum, although not necessarily the same spectrum. Radio Z may operate over unlicensed spectrum such as to a local Wi-Fi access point 336.

In the case of licensed spectrum, the operator may send Quality of Service ("QoS") measurements 338 to the mobile device. The bandwidth monitor 324 may intercept these calls and forward some of the information from the intercepted QoS measurements 338 to the optimizer 318. In this way, the optimizer 318 can optimize load balancing taking into account reported conditions from the base station, cellular core network, and portions of a cellular communications connection from a cellular operator.

Load Balancing Licensed and Unlicensed Spectrum

Figure 4:
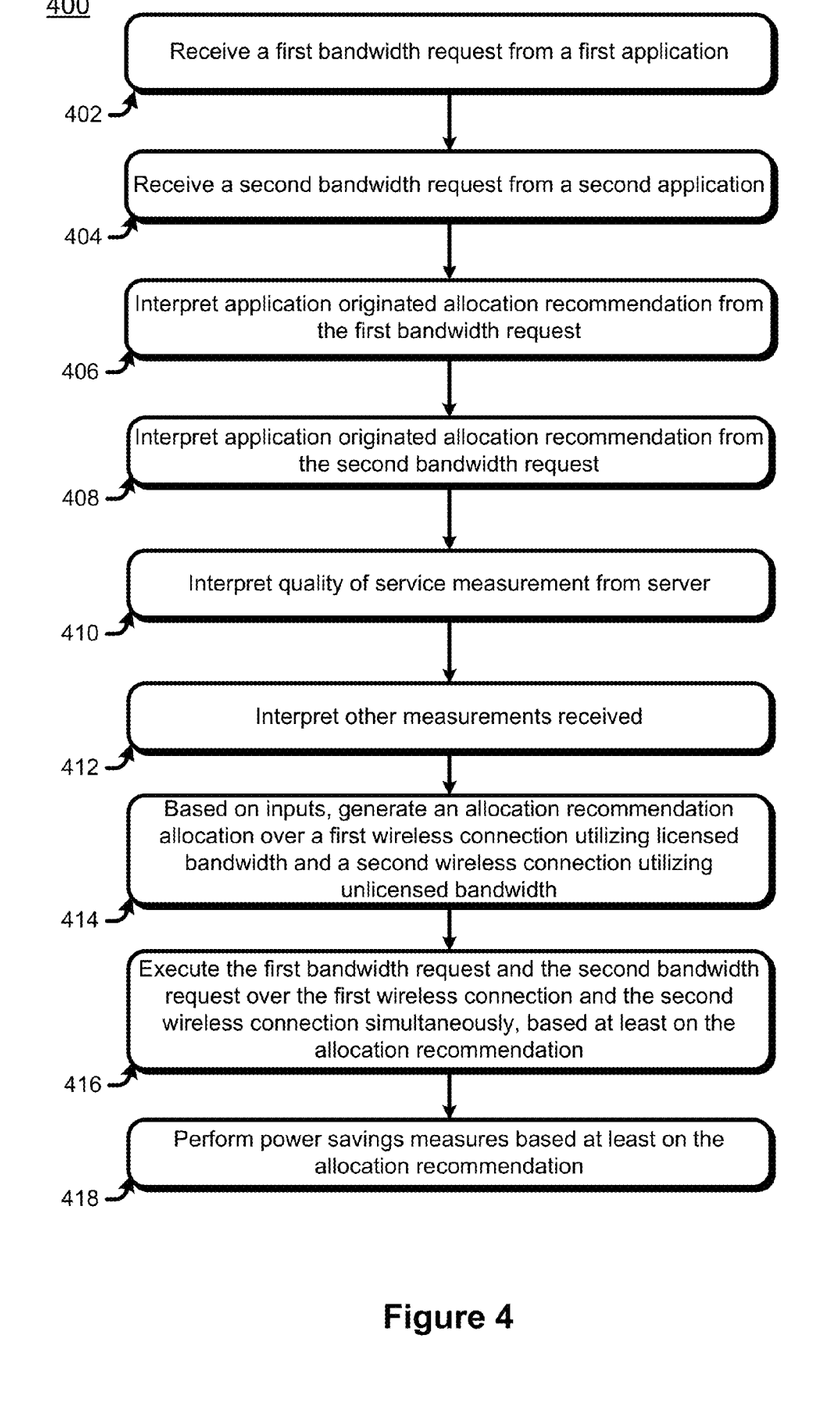
FIG. 4 is a flow chart of an example process to perform simultaneous communications over licensed spectrum and unlicensed spectrum.

FIG. 4 is a flowchart 400 of an exemplary method of load balancing available bandwidth over a communications connection over licensed spectrum and a communications connection over unlicensed spectrum.

The optimizer 318 may receive one or more bandwidth requests. In blocks 402 and 404, the optimizer receives a first bandwidth request from a first application and a second bandwidth request from a second application respectively.

In order to generate a load balancing recommendation, the optimizer 318 will receive a number of inputs in form of messages. The optimizer 318 will interpret the message to extract out data relevant to an optimization calculation. Interpretation may be in the form of parsing the data in the message, extracting out relevant data, converting the data to a format amenable for performing calculations, and storing the data.

Since applications 302 and/or 304 may programmatically monitor their own state, an application 302 and/or 304 may generate a recommendation for how to load balance a bandwidth request allocations 306 and/or 308. The allocation recommendation may be included in the bandwidth request 306 and/or 308, or sent in a separate message. Regardless, the application 302 and/or 304 originates and transmits a load balancing allocation recommendation. In blocks 406 and 408, the optimizer receives and interprets the application originated allocation recommendation of the first bandwidth request 306 and second bandwidth request respectively 308.

In addition to receiving allocation hints from applications, the optimizer 318 may receive server originated quality of service measurements 338. Typically, server originated quality of service measurements 338 are generated by cellular operator servers that perform quality of service operations and may transmit quality of service measurements 338 to mobile client. In block 410, the optimizer 318 receives and interprets server originated quality of service measurements.

The optimizer 318 may still receive yet other data. One example is to monitor devices on the mobile device such as the power draw on a local battery. Another example is to receive external data, such as data plan pricing information. Specifically, a first communications connection may have a first monetary data rate cost, and a second communications connection may have a second monetary data rate cost. Accordingly, the optimizer 318 may optimize bandwidth allocations to favor the communications connection with the lesser monetary data rate cost. In block 412, the optimizer 318 interprets these other inputs.

While the optimizer 318 may maintain simultaneous communications with the first communications connection and the second communications connection, if the bandwidth from the connection with the lesser monetary data rate cost satisfies the present communications needs, the other connection may be placed in an inactive state. However, the optimizer 318 and/or the load balancer 320 will maintain a handle to both connections at all times such that when traffic capacity may be sufficiently handled by the connection with the lesser monetary data rate, the other connection may be activated/reactivated substantially in real time. In this way, simultaneous communications over both the first and second communications connections are maintained during low traffic conditions.

Once the optimizer 318 interprets all inputs, the optimizer 318 may then generate a load balancing recommendation in block 414. The recommendation will enumerate all pending bandwidth requests. In this case, these are the first and second bandwidth requests. The recommendation will then map the first and second bandwidth requests to a recommended allocation of from a first communications connection and a recommended allocation from a second communications connection. In some cases, the first bandwidth request may be mapped solely to the first communications connection. In other cases, the first bandwidth request may be mapped solely to the second communications connection. Alternatively, the first bandwidth request may be mapped to some combination of the first and second communications connections. The recommendations may have separate mappings for upload and download. For example, the first communications connection may solely perform download operations for the first bandwidth request and the second communications connection may solely perform upload operations for the first bandwidth request.

Upon generating a recommendation, in block 416, the load balancer 320 performs the recommendation. Specifically, the load balancer 320 retrieves the bandwidth according to the recommendation from the radio interface layer 316. The load balancer 320, then returns the bandwidth allocations from the radio interface layer 316 to the network stack 314, for return to the calling applications 302 and/or 304 via the resource manager 312.

The optimizer 318 may be directed towards power savings. In such situations, in block 418, the optimizer 318 may shut off radios for one or more communications connections. Specifically, if a single communications connection is sufficient to handle bandwidth requests 306 and/or 308, the optimizer 318 may opt to turn off redundant radios.

Bandwidth Monitoring

Figure 5:
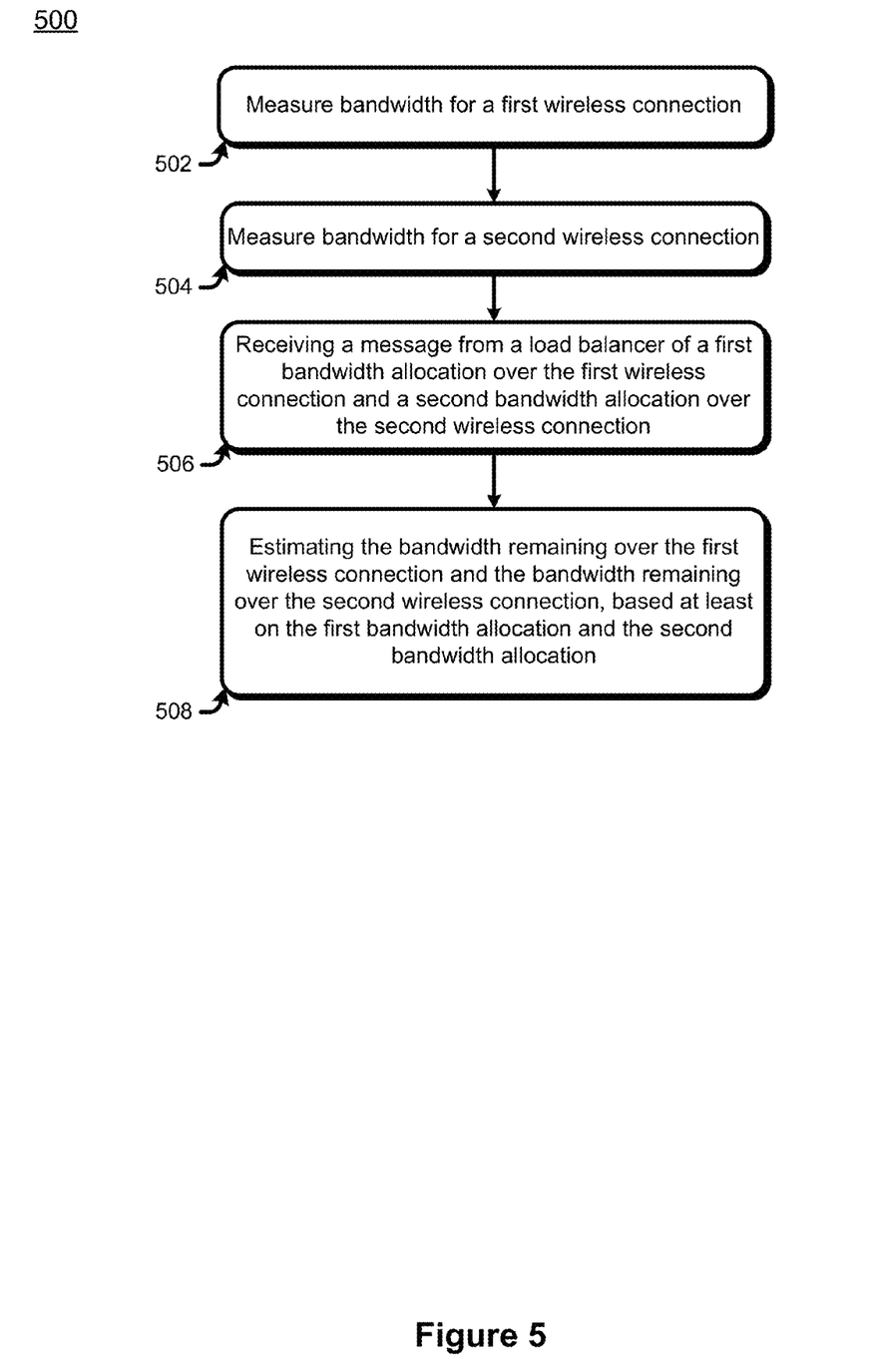
FIG. 5 is a flow chart of an example process to perform bandwidth monitoring for simultaneous communications over licensed spectrum and unlicensed spectrum.

One of the inputs to the optimizer/load balancer 318/320 is the amount of bandwidth available from the communications connection over licensed spectrum and the communications connection over unlicensed spectrum. Bandwidth may be measured by querying the radio interface layer 316. However, a large number of queries to the radio interface layer 316 may slow down communications processing by the radio interface layer 316. However, since the load balancer allocates bandwidth, the amount of bandwidth available may be updated by subtracting allocations as reported by the load balancer with a previous bandwidth measurement. FIG. 5 is a flowchart 500 of an exemplary process to limit radio interface layer 316 queries by estimating available bandwidth based on information from the load balancer.

In blocks 502 and 504, the bandwidth monitor 324 measures the bandwidth for a first wireless connection and a second wireless connection respectively. The measurement may be an API call to the radio interface layer 316. Alternatively, the bandwidth monitor 324 may receive a notification from the radio interface layer 316 in the form of an event.

In block 506, the bandwidth monitor 324 receives a message from the load balancer of how much bandwidth will be allocated from the first wireless connection and how much bandwidth will be allocated from the second wireless connection.

In block 508, the bandwidth monitor 324 estimates a new available bandwidth for the first wireless connection and the second wireless connection. For example, the bandwidth monitor 324 may subtract the bandwidth allocation from the first wireless connection to the bandwidth monitor measurement in block 502. The bandwidth monitor similarly subtracts the bandwidth allocation from the second wireless connection to the bandwidth monitor measurement in block 504. Alternatively, the bandwidth monitor may make an analogous addition of bandwidth allocation based on monitoring completed allocation requests. After a predetermined number of iterations estimating available bandwidth from load balancer 320 performing load balancing recommendations, the actual available bandwidth is measured by invoking the radio interface layer 316.

In this way, available bandwidth estimates may be made while reducing the load on the radio interface layer 316.

Exemplary Applications

Based on the foregoing, a mobile client 202 may load balance one or more bandwidth requests simultaneously over communications connections over licensed and unlicensed spectrum. The following describes exemplary embodiments applying simultaneous communications over licensed and unlicensed spectrum.

Bandwidth Spike: Internet data traffic tends to be "bursty." In other words, rather than utilizing a constant level of bandwidth, Internet applications tend to have a massive bandwidth spike followed by low or zero bandwidth utilization. For example, a user may trigger a spike when requesting a webpage followed by no bandwidth utilization while the user reads the received webpage. Similarly, when a user downloads a photo from a server, there is a bandwidth download spike followed by relatively low bandwidth utilization. The same is true in reverse when a user uploads a photo. In these bandwidth spike situations, one optimization is to maximize allocations of all connections to satisfy the bandwidth spike by maximizing bandwidth allocations on all available connections. A bandwidth spike could be determined by receiving a bandwidth request that exceeds a predetermined threshold. The predetermined threshold could be set via a user profile. It may also be set by an operator having historical data as to what constitutes a burst. Alternatively, the mobile device 202 may store its own historical data, and may generate the threshold based on a statistical analysis of its historical data.

Depending on the application, the bandwidth spike may only be in one direction of the communications connection. Accordingly, the allocation may be limited for either upload or for download. Accordingly, the allocation may be for a balance of upload and download.

Quality of Service Optimization: Another optimization is to allocate bandwidth to maximize quality of service. For example, the optimizer could make a quality of service measurement for a first communications connection and a second communications connection. If the first communications connection had a substantially higher quality of service measurement, the optimizer 318 might maximize allocation to the first communications connection. Similarly, if the second communications connection had a substantially higher quality of service measurement, the optimizer 318 might maximize allocation to the second communications connection. For example, the optimizer 318 might receive a measure of communications connection latency, such as the time for the round trip of an internet protocol ("IP") packet. Alternatively, the optimizer 318 might receive a latency measurement from a server from a cellular operator from one of the communications connections. Regardless of the source, the optimizer 318 might maximize allocation to the communications connection with the lowest latency.

Offloading Based on Data Rate Monetary Cost: The optimizer 318 may also optimize by minimizing data cost to the user. The mobile device may receive information regarding the monetary cost of data over a first communications connection and the monetary cost of data over a second communications connection. The optimizer 318 could maximize bandwidth allocation on over the communications connection with the lowest monetary cost of data, in this case reducing the overall data cost to the user.

Power Optimization: The optimizer 318 may also optimize by minimizing the power draw against a mobile devices battery. Specifically, the optimizer 318 could receive measurements of the power draw of a first communications connection and of a second communications connection. For example, different radios will have different rates of power draw. For example, a cellular radio which must transmit over longer distances may use significantly more power than a Wi-Fi radio which need only transmit a few yards. The optimizer 318 may receive measurements via a user profile, via a static setting by a cellular operator, or alternatively by dynamically measuring power draw via monitors 322. The optimizer 318 could maximize bandwidth allocation on over the communications connection with the lowest power draw, in this case reducing the overall power draw of the mobile device 202 and thereby extending the power lifetime of the battery.

Tethering Counts: One external measure to estimate bandwidth requirements is to count the number of devices tethered to a mobile device 202. Where a larger number of devices are tethered, the optimizer 318 may establish a larger number of communications connections. Where a smaller number of devices are tethered, the optimizer 318 may disconnect some of the communications connections.

Shutting Off Redundant Radios: In some cases, the optimizer 318 may determine that a communications connection is not needed. For example, where a user is primarily engaged in text services, such as short message service ("SMS") messaging, that user does not use a large amount of bandwidth. On a mobile device 202 with a first communications connection and a second communications connection active, the optimizer 318 may determine that the one communications connection is sufficient to map to the bandwidth requests. In this case, the optimizer 318 may shut the radio corresponding to the redundant second radio off, thereby reducing overall power draw of the mobile device 202 and thereby extending the power lifetime of the battery.

Failover: The theme of creating and deallocating communications connections applies also to failover. Specifically, an optimizer 318 may make a quality of service measurement on a first communications connection and on a second communications connection. If the quality of service measurement for the second communications connection is significantly lower than the first communications connection, the optimizer may simply turn off the second communications connection to favor the first communications connection with the higher quality of service measure. In the event the first communications connection did not have sufficient bandwidth to honor bandwidth requests, the optimizer might store the previous quality of service measurement for the second communications connection, and may opt to create a third communications connection, anticipating that the third communications connection would have a higher quality of service than the second communications connection.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device system to load balance communications connections, comprising:
    a processor;
    a memory coupled to the processor and operable to store processor readable instructions;
    a first radio configured to communicate over a wireless communications connection using bandwidth available over licensed spectrum;
    a second radio configured to communicate over a wireless communications connection using bandwidth available over unlicensed spectrum, and having access to substantially similar endpoints as the wireless communications connection of the first radio;
    a bandwidth monitor component, coupled to the processor, memory, first radio, and second radio, operable to monitor the available bandwidth over licensed spectrum from the first radio, and the available bandwidth over unlicensed spectrum from the second radio;
    an optimizer component, coupled to the processor, memory, and bandwidth monitor, configured
        to receive a bandwidth request from an application resident in the memory and running on the processor,
        to receive an indicator of the available bandwidth over licensed spectrum from the first radio and the available bandwidth over unlicensed spectrum from the second radio from the bandwidth monitor, and
        to generate a load balancing recommendation based on at least the bandwidth request, the available bandwidth over licensed spectrum from the first radio and the available bandwidth over unlicensed spectrum from the second radio; and
    a load balancer component, coupled to the processor, memory, and optimizer component, and configured to receive a load balancing recommendation from the optimizer component and configured to satisfy the bandwidth request from the application with at least some available bandwidth over licensed spectrum from the first radio, and at least some available bandwidth over unlicensed spectrum from the second radio, based at least on the load balancing recommendation,
    wherein the bandwidth request includes an application originated load balancing recommendation of how to balance available bandwidth over licensed spectrum from the first radio and the available bandwidth over unlicensed spectrum from the second radio, and
    wherein the load balancing recommendation generated by the optimizer component is further based at least on the application originated load balancing recommendation.

2. The system of claim 1, wherein the bandwidth monitor is further configured to receive a quality of service measurement of the licensed spectrum utilized by the first radio, and configured to send the quality of service measurement to the optimizer; and
    wherein the load balancing recommendation generated by the optimizer component is further based at least on the quality of service measurement received from the bandwidth monitor.

3. A method to load balance communications connections, comprising:
    receiving, on a mobile device, a bandwidth request from an application running on the mobile device, the bandwidth request comprising an amount of bandwidth;
    allocating to the application at least a portion of licensed bandwidth of a first wireless connection, the first wireless connection utilizing licensed spectrum;
    allocating to the application at least a portion of unlicensed bandwidth of a second wireless connection, the second wireless connection utilizing unlicensed spectrum, and having access to substantially similar endpoints as the first wireless communications; and
    simultaneously communicating over the licensed bandwidth of the first wireless connection and over the unlicensed bandwidth of the second wireless connection, such that the allocated licensed bandwidth and the allocated unlicensed bandwidth equals or exceeds the amount of bandwidth for the bandwidth request,
    wherein the allocations are performed at the mobile device.

4. The method of claim 3, the method further comprising:
    determining that the amount of bandwidth for the bandwidth request exceeds a predetermined threshold;
    responsive to the determining that the amount of bandwidth for the bandwidth request exceeds the predetermined threshold, maximizing both the allocation of the licensed bandwidth and the allocation of the unlicensed bandwidth to the application.

5. The method of claim 4, wherein the predetermined threshold is a function of upload bandwidth, of download bandwidth, or of both.

6. The method of claim 3, the method further comprising:
measuring a first quality of service measure of the first wireless connection;
measuring a second quality of service measure of the second wireless connection;
determining which of the first quality of service measure or the second quality of service measure is greater;
when determining that the first quality of service measure is greater than the second quality of service measure, increasing the allocation of the unlicensed bandwidth; and
when determining that the second quality of service measure is greater than the first quality of service measure, increasing the allocation of the licensed bandwidth.

7. The method of claim 6, wherein the first quality of service measure is a latency measure of the first wireless connection and the second quality of service measure is a latency measure of the second wireless connection.

8. The method of claim 4, the method further comprising:
measuring a first power draw measure of the first wireless connection;
measuring a second power draw measure of the second wireless connection;
determining which of the first power draw measure or the second power draw measure is greater;
when determining that the first power draw measure is greater than the second power draw measure, increasing the allocation of the unlicensed bandwidth and decreasing the allocation of the licensed bandwidth; and
when determining that the second power draw measure is greater than the first power draw measure, increasing the allocation of the licensed bandwidth and decreasing the allocation of the unlicensed bandwidth.

9. The method of claim 3, the method further comprising:
storing a first monetary cost of the data rate of the first wireless connection;
storing a second monetary cost of the data rate of the second wireless connection;
determining which of the first monetary cost or the second monetary cost is greater;
when determining that the first monetary cost is greater than the second monetary cost, increasing the allocation of the unlicensed bandwidth and decreasing the allocation of the licensed bandwidth; and
when determining that the second monetary cost is greater than the first monetary cost, increasing the allocation of the unlicensed bandwidth and decreasing the allocation of the licensed bandwidth.

10. The method of claim 3, wherein the bandwidth request includes an application originated load balancing recommendation of how to balance available bandwidth over licensed spectrum from the first wireless connection, and the available bandwidth over unlicensed spectrum from the second wireless connection; and
wherein the allocation of the licensed bandwidth and the allocation of the unlicensed bandwidth is based at least on the application originated load balancing recommendation.

11. The method of claim 3, further comprising:
receiving over the first wireless connection, a server originated quality of service measurement; and
wherein the allocation of the licensed bandwidth and the allocation of the unlicensed bandwidth is based at least on the server originated quality of service measurement.

12. The method of claim 3, further comprising:
receiving, on the mobile device, a second bandwidth request from a second application running on the mobile device, the second bandwidth request comprising a second amount of bandwidth; and
wherein the simultaneously communicating over the licensed bandwidth of the first wireless connection and over the unlicensed bandwidth of the second wireless connection, is such that the allocated licensed bandwidth and the allocated unlicensed bandwidth equals or exceeds the amount of bandwidth for the second bandwidth request in addition to the amount of bandwidth for the first bandwidth request.

13. The method of claim 12, further comprising:
determining that the first amount of bandwidth from the first bandwidth request in addition to the amount of bandwidth for the second bandwidth request, is less than the allocation of bandwidth from the second wireless connection; and
responsive to the determination, turning off a radio corresponding to the first wireless connection, in order to conserve power.

14. The method of claim 13, wherein, the determining that the first amount of bandwidth from the first bandwidth request in addition to the amount of bandwidth for the second bandwidth request, is less than the allocation of bandwidth from the second wireless connection is based at least on determining a number of tethered devices corresponding to the first bandwidth request and the second bandwidth request.

15. The method of claim 3, further comprising:
measuring a first quality of service measure of the first wireless connection;
measuring a second quality of service measure of the second wireless connection;
determining which of the first quality of service measure or the second quality of service measure is greater;
when determining that the first quality of service measure exceeds the second quality of service measure by a predetermined threshold, turning off a radio corresponding to the second wireless connection; and
when determining that the second quality of service measure exceeds the first quality of service measure by a predetermined threshold, turning off a radio corresponding to the first wireless connection.

16. A method for monitoring bandwidth, comprising:
receiving a bandwidth request;
measuring a first bandwidth for a first wireless connection, via a communications with a radio interface layer;
measuring a second bandwidth for a second wireless connection, via a communications with a radio interface layer;
receiving a message from a load balancer of a first bandwidth allocation on the first wireless connection and a second bandwidth allocation on the second wireless connection; and
reducing queries to the radio interface layers by estimating the bandwidth remaining from the first bandwidth and the bandwidth remaining from the second bandwidth, based at least on the first bandwidth allocation and the second bandwidth allocation,
wherein the load balancer is located at a mobile device,
wherein measuring the first and second bandwidths, receiving the message and estimating the bandwidth are performed at the mobile device,
wherein receiving a bandwidth request from an application resident in the memory and running on a processor of the mobile device, wherein measuring the first bandwidth or the measuring the second bandwidth is based on the received bandwidth request.

17. The method of claim 16, wherein either the measuring the first bandwidth or the measuring the second bandwidth is via a query.

18. The method of claim 16, wherein either the measuring the first bandwidth or the measuring the second bandwidth is via a notification from the radio interface layer.

19. A method to load balance communications connections, comprising:
  receiving, on a mobile device, a bandwidth request from an application running on the mobile device, the bandwidth request comprising an amount of bandwidth;
  allocating to the application at least some licensed bandwidth over a cellular communications connection;
  allocating to the application at least some unlicensed bandwidth of a Wi-Fi communications connection, and having access to substantially the same endpoints as the cellular communications connection; and
  simultaneously communicating over the licensed bandwidth of the cellular communications connection and over the unlicensed bandwidth of the Wi-Fi communications connection, such that the allocated licensed bandwidth and the allocated unlicensed bandwidth equals or exceeds the amount of bandwidth for the bandwidth request,
  wherein the allocations are performed at the mobile device.

* * * * *